United States Patent [19]

Takemori et al.

[11] Patent Number: 5,160,760
[45] Date of Patent: Nov. 3, 1992

[54] HEAT-RESISTANT CHOCOLATE AND A METHOD FOR PRODUCING IT

[75] Inventors: Toshio Takemori; Toshinobu Tsurumi; Masahiro Takagi, all of Urawa, Japan

[73] Assignee: Lotte Company Limited, Tokyo, Japan

[21] Appl. No.: 482,970

[22] Filed: Feb. 22, 1990

[30] Foreign Application Priority Data

Apr. 15, 1989 [JP] Japan .................................. 1-95970

[51] Int. Cl.⁵ .............................................. A23C 3/00
[52] U.S. Cl. .................................... 426/660; 426/602; 426/658
[58] Field of Search ............... 426/660, 601, 602, 658, 426/524

[56] References Cited

U.S. PATENT DOCUMENTS

| | | | |
|---|---|---|---|
| 2,760,867 | 8/1956 | Kempf et al. | 426/660 |
| 4,045,583 | 8/1977 | Jeffery et al. | 426/660 |
| 4,446,166 | 5/1984 | Giddey et al. | 426/660 |
| 4,865,856 | 9/1989 | Groen | 426/660 |
| 4,895,732 | 1/1990 | Suwa et al. | 426/660 |
| 4,980,192 | 12/1990 | Finkel | 426/660 |

Primary Examiner—R. B. Penland
Attorney, Agent, or Firm—Young & Thompson

[57] ABSTRACT

There is disclosed a heat-resistant chocolate which is formed by dispersing and mixing a water-in-oil emulsion and a chocolate base material, wherein an oil phase and a water phase in which a hydrophilic substance is contained are mixed and emulsified with an emulsifying agent to form said water-in-oil emulsion. There is also disclosed a method for producing a heat-resistant chocolate, wherein a water-in-oil emulsion is mixed and dispersed which is formed by mixing and emulsifying an oil phase and a water phase in which a hydrophilic substance is contained using a emulsifying agent into a chocolate base material which is temperature-tempered by an usual mean, which is cooled to form a solid, after which increase in heat-resistance depending on time is contemplated.

8 Claims, No Drawings

HEAT-RESISTANT CHOCOLATE AND A METHOD FOR PRODUCING IT

FIELD OF THE INVENTION

The present invention relates to a chocolate having heat-resistance, and more particularly relates to a chocolate and a method for producing it in which a framing structure is gradually formed with solids other than oils and fats to give a smooth melt feeling in mouth and a soft mouth-feel keeping a good quality level equivalent to that of a conventional good chocolate, and with shape retention at a temperature above 40° C. such that it is not sticky to the direct touch.

BACKGROUND OF THE INVENTION

Chocolate has the disadvantage that the better the quality of the chocolate, the more easily the influence of temperature affects it. Conventional chocolate becomes soft at above 28° C., and loses shape retention at above 32° C. Thus, in order to overcome such disadvantage, a number of investigations on heat-resistant chocolate have conventionally been carried out.

A rough classification of conventional technologies relating to heat-resistant chocolates may give the following two types:
(1) oils and fats used have a high melting point,
(2) a framing structure is formed with solids other than oils and fats.

Among them, there are the following methods, for example, as means for forming the framing structure of above type (2), which are used alone or in combination in order to increase heat-resistance of chocolate:
 a. hydrophilic substances (several kinds of sugar and the like) are used,
 b. water or an emulsion is used,
 c. a chocolate is treated at a high temperature,
 d. a part of chocolate or materials thereof is preground.

However, in the conventional technologies, all heat-resistant chocolate obtained have problems of quality, being unsuccessful as practical products.

Namely, according to said method (1), oils and fats of high melting point are used, so that a waxy mouth-feel is provided, which lacks a smooth melt feeling in mouth characteristic to chocolates. In addition, according to said method (2), a framing structure is given, so that a crunchy and brittle mouth-feel is provided, which also lacks a smooth melt feeling in mouth and a good snap property.

Attempts to provide heat-resistant chocolates by forming a frame structure with solid substances other than oils and fats are described, for example, in Japanese laid-open patent application No. 57-115140. In this prior art, there is disclosed "a heat-resistant chocolate composition containing particles which form a "water/lipid type" emulsion comprising lipid at least a part of which is solidified, being dispersed in a chocolate composition in addition to usual chocolate components."

However, a chocolate of good quality may not be produced by means of this technology. A chocolate produced by this technology has large particles and a rough mouth-feel in which the framing structure gives a munchy mouth-feel to give a problem in quality. In this technology, at least a part of lipid substances which construct an emulsion of water/cacao butter type containing lecithin is solid lipids. In fact, for the purpose of stabilizing the emulsion, the content of solid lipid is not less than 30%. Although the solid lipid which may make the quality low is used in a high content, this emulsion is practically very unstable. In case of mixing with a chocolate, on account of variation or the like of temperature condition and agitation condition, a partial agglomeration of solid particles of chocolate (especially sugar) takes place, which becomes a cause of roughness. Moreover, the water phase in the W/O type emulsion is pure water, so that it affects to solid particles of chocolate too excess, resulting in a munchy mouth-feel of obtained chocolate.

SUMMARY OF THE INVENTION

The object of the present invention is to provide a heat-resistant chocolate in which a framing structure is gradually formed with solids other than oils and fats to give a smooth melt feeling in mouth and a soft mouth-feel keeping a good quality level equivalent to an usual good chocolate with shape retention at a temperature above 40° C. such that it is not sticky to the direct touch.

According to the present invention, there is provided a heat-resistant chocolate which is formed by dispersing and mixing a water-in-oil emulsion and a chocolate base material, wherein an oil phase and a water phase in which a hydrophilic substance is contained are mixed and emulsified with an emulsifying agent to form said water-in-oil emulsion. This is a heat-resistant chocolate produced by dispersing and mixing a W/O type emulsion and a chocolate, said W/O type emulsion being emulsified with a emulsifying agent in which hydrophilic substances-containing aqueous solution is the water phase and oils and fats having little change of solid lipid content depending on temperature is the oil phase.

Also according to the present invention, there is provided a method for producing a heat-resistant chocolate, wherein a W/O type emulsion is dispersed and mixed in a liquid chocolate which is temperature-tempered by an usual method at a temperature, for example, 45° C., contemplating increase in heat-resistance depending on time, said W/O type emulsion being emulsified with a emulsifying agent in which hydrophilic substances-containing aqueous solution is the water phase and oils and fats having little change of solid lipid content is the oil phase.

PREFERRED EMBODIMENT OF THE INVENTION

It is preferable that the hydrophilic substance in the W/O type emulsion is selected from a group consisting of saccharides such as sugar, grape sugar, fruit sugar, malt sugar, starch syrup and the like, and sugar alcohols such as sorbitol, maltitol syrup and the like. Preferably, an amount of hydrophilic substances in the W/O type emulsion is 20 to 60%.

It is preferable that a SFI of oils and fats in the W/O type emulsion is not more than 20 at 20° C. and not more than 10 at 30° C., and an AOM thereof is not less than 20 hours. An amount of oils and fats in the W/O type emulsion is preferably 30 to 60%. Here the AOM represents the stability to oxidation (active oxidant method).

It is preferable that the emulsifying agent in the W/O type emulsion is selected from a group consisting of lecithin, glycerol fatty acid ester, polyglycerol fatty acid ester, polyglycerol condensed ricinoleic acid ester and sucrose fatty acid ester (which has a HLB not more than 7).

It is preferable that a range of 10 to 50%, preferably 15 to 25% of water, 20 to 60% of hydrophilic substances, 30 to 60% of oils and fats, and 0.1 to 3% of emulsifying agent are contained in the W/O type emulsion.

It is preferable that a mixing proportion of the W/O type emulsion is in a range of 4 to 15%, more preferably an amount for addition is 4 to 10%.

As described in the above, a chocolate produced by conventional technology has large particles and a rough mouth-feel in which a framing structure give a munchy mouth-feel to give a problem in quality. In order to overcome this problem in quality, in the present invention, hydrophilic substances and a specific emulsion are used in the W/O type emulsion, water content in the W/O type emulsion is preferably 15 to 25%, and SFI of oils and fats which form the W/O type emulsion is optionally adjusted to solve the problem.

In the present invention, a hydrophilic substance is added to the water phase of the W/O type emulsion, a specific emulsifying agent is used, and oils and fats which have little change of solid lipid content depending on temperature are used, so that the W/O type emulsion is stabilized to prevent roughness of chocolate to take place.

When the W/O type emulsion of the present invention is mixed to a chocolate, because saccharides dissolved in the water phase are contained, solid particles of chocolate are rapidly effected to form a frame structure, while the frame structure is formed more softly than that with pure water, so that a product having a smooth mouth-feel is provided.

The chocolate in which the W/O type emulsion is mixed is produced, for example, by charging to a mold, cooling, removing from the mold and thereafter packaging to give a product according to an usual method, which does not show considerable heat-resistance immediately after production. Storage for about 20 days is carried out to contemplate increase in heat-resistance depending on time to obtain a chocolate which has shape retention at a temperature above 40° C. being not sticky to the direct touch having a good quality.

The feature of the present invention will be more fully explained as follows comparing the present invention mainly to the above prior art described in Japanese laid-open patent application No. 57-115140.

In the Japanese laid-open patent application No. 57-115140, as described in Examples thereof, the water phase of the W/O type emulsion is water. On the other hand, in the present invention the water phase of the W/O type emulsion is a solution containing hydrophilic substances. On account of this difference, on addition of the W/O type emulsion to a chocolate, in case of Japanese laid-open patent application No. 57-115140, water in the emulsion effects more locally and rapidly on solid particles in chocolate, resulting in rough and munchy mouth-feel, while in case of using the solution of the present invention, water effects gradually and as a whole, so that a framing structure is formed more softly, resulting in a smooth mouth-feel.

The W/O type emulsion of Japanese laid-open patent application No. 57-115140 is unstable, because the water phase is water which has low viscosity, lecithin is used which has low emulsifying power of W/O type as an emulsifying agent, and water content in the emulsion is 30 to 80% of high water content. Therefore, in Japanese laid-open patent application No. 57-115140, in order to stabilize the unstable W/O type emulsion, it is necessary to solidify at least not less than 30% of oils and fats in the outer layer and to retain the W/O type emulsion with shape retention power of oils and fats. Moreover, at the time when this is added to a chocolate, oils and fats are melt to give a product of homogeneous chocolate unless complete mixing with lipid portion in the chocolate takes place. Thus, it is necessary to use such oils and fats those rapidly form liquid at a mixing temperature (26° to 32° C.) for example, cacao butter, CBE (tempered type hard butter) and the like. However, these oils and fats have a steep slope of the SFI curve. Namely, these inevitably have a such property that solid oil content greately changes depending on only 0.5° to 1° C. of temperature change. This means that a property of produced chocolate greatly changes depending on small variation or change of temperature condition and agitation condition, so that partial agglomeration of solid particles of chocolate easily takes place causing roughness or the like. On the contrary, in the present invention, the water phase is a solution, a specific emulsifying agent is used as an emulsifier, and the water content of the emulsion is low, preferably 15 to 25%, so that the W/O type emulsion is more stable, and it is not necessary to solidify oils and fats in the outer layer in order to stabilize the emulsion, the W/O type emulsion being able to use in a fluidized state. In addition, this means that oils and fats and the like may be used in which the property of oils and fats used give a small change depending on temperature change, so that roughness does not takes place being compared to said Japanese laid-open patent application No. 57-115140.

The emulsifying agents which may be esed in the present invention include, for example, lecithin, glycerol fatty acid ester, polyglycerol fatty acid ester, polyglycerol condensed ricinoleic acid ester and sucrose fatty acid ester (which has a HLB not more than 7).

In the present invention, oils and fats having little change of solid lipid content depending on temperature are used, wherein such oils and fats those give little property change depending on time during mixing of chocolate and the W/O type emulsion are preferable because of the reasons described in the above. Those having AOM of not less than 20 may be considered as a basic ones. Desirable oils and fats in the present invention include those in which a SFI of oils and fats is not more than 20 at 20° C. and not more than 10 at 30° C., and an AOM thereof is not less than 20.

When the present invention is compared to that of Japanese laid-open patent application No. 57-115140 from a view of water content in the emulsion, 30 to 80% of the former partially overlap 10 to 50% of the latter in the content, while as described in the above, in the present invention, the emulsion is stabilized by the distinct function to prevent roughness, and the action of water is considered to be different.

In the present invention, heat-resistance is not so high immediately after shaping, while increase in heat-resistance depending on time is contemplated by storing for about 20 days to increase shape retention (heat-resistance).

A framing structure may not be formed immediately after shaping yet, and little difference exists in heat-resistance comparing to usual chocolates. The framing structure is gradually formed to increase heat-resistance depending on time. And afrer about 20 days, heat-resistance becomes not less than 40° C. to provide a completed heat-resistance chocolate.

According to the present invention, there is provided a heat-resistance chocolate in which a framing structure is gradually formed with solids other than oils and fats to give a smooth melt feeling in mouth and a soft mouth-feel keeping a good quality level equivalent to an usual good chocolate with shape retention at a temperature above 40° C. being not sticky to the direct touch.

The present invention will be explained in detail by following examples, only to which the present invention is not limited.

EXAMPLE 1

Three parts of malt sugar was dissolved in two parts of water to make an aqueous solution. And then in three parts of oils and fats which have a solid lipid content of 8% at 20° C. and of 5% at 30° C., 0.1 part of sucrose fatty acid ester (HLB 2) was dissolved followed by mixing said aqueous solution with agitation to make a fluidized emulsion. Production was carried out controlling the production temperature in such a way that the temperature of this emulsion was 28° C.

A milk chocolate which was produced by a conventional method was tempered to 30° C., and 92 parts of this chocolate was mixed with 8 parts of the emulsion. The temperature of the chocolate after mixing was 30° C. This was charged to a mold, and enough cooling was carried out before removing from the mold to package. This product, which lost shape retention at 31° C. immediately after production, retained shape retention under an atmosphere of 40° C. and 50° C. after storage for 20 days at 18° C. Moreover, the mouth-feel thereof was very smooth without roughness, having a soft and good chewing property.

EXAMPLE 2

Four parts of sorbitol powder was dissolved in 1.5 parts of water to make an aqueous solution. And then in 4.5 parts of oils and fats which have a solid lipid content of 15% at 20° C. and of 10% at 30° C., 0.1 part of lecithin was dissolved followed by mixing said aqueous solution with agitation to make a fluidized emulsion. Production was carried out controlling the production temperature in such a way that the temperature of this emulsion was 28° C.

A dark chocolate which was produced by a conventional method was tempered to 31° C., and 90 parts of this chocolate was mixed with 10 parts of the emulsion. The temperature of the chocolate after mixing was 31° C. This was processed to a product, as described in Example 1, resulting in a heat-resistant chocolate having a good quality after passing same term as described in Example 1.

What is claimed is:

1. A heat-resistant chocolate, consisting essentially of a mixture of a water-in-oil emulsion and a chocolate base material, said mixture containing an emulsifying agent; said water-in-oil emulsion containing, prior to mixing with said chocolate base material, a water-soluble material dissolved in the aqueous phase of said water-in-oil emulsion, said water-soluble material being selected from the group consisting of saccharides and sugar alcohols; wherein the water-in-oil emulsion comprises oils and fats having an SFI not more than 20 at 20° C. and not more than 10 at 30° C.

2. The heat-resistant chocolate according to claim 1, wherein the saccharides are selected from the group consisting of sugar, grape sugar, fruit sugar, malt sugar, and starch syrup, and wherein the sugar alcohols are selected from the group consisting of sorbitol and maltitol syrup.

3. The heat-resistant chocolate according to claim 1, wherein the water-in-oil emulsion comprises oils and fats having an AOM of not less than 20 hours.

4. The heat-resistant chocolate according to claim 1, wherein said emulsifying agent is selected from the group consisting of lecithin, glycerol fatty acid ester, polyglycerol fatty acid ester, polyglycerol condensed ricinoleic acid ester, and sucrose fatty acid ester having an HLB not greater than 7.

5. The heat-resistant chocolate according to claim 1, wherein said water-in-oil emulsion comprises 10–50% water, 15–60% of said water-soluble material, 30–60% oils and fats, and 0.1–3% of said emulsifying agent.

6. The heat-resistant chocolate according to claim 1, wherein said mixture comprises 4–15% of said water-in-oil emulsion.

7. A method for producing a heat-resistant chocolate, comprising mixing a water-in-oil emulsion with a temperature-tempered chocolate base material, said water-in-oil emulsion containing, prior to mixing with said chocolate base material, a water-soluble material dissolved in the aqueous phase of said water-in-oil emulsion, said water-soluble material being selected from the group consisting of saccharides and sugar alcohols; and cooling the mixture to form a solid having increased heat resistance; wherein the water-in-oil emulsion comprises oils and fats having an SFI not more than 20 at 20° C. and not more than 10 at 30° C.

8. The method according to claim 7, wherein the water-in-oil emulsion contains an emulsifying agent.

* * * * *